United States Patent [19]

Myers

[11] Patent Number: 4,583,779
[45] Date of Patent: Apr. 22, 1986

[54] SUN SHADE FOR AN INFANT'S CAR SEAT

[76] Inventor: Patricia A. Myers, Post Office Box 228, Boston Bar, British Columbia, Canada, V0K 1C0

[21] Appl. No.: 601,691

[22] Filed: Apr. 18, 1984

[51] Int. Cl.[4] ............................................. A47C 7/10
[52] U.S. Cl. ...................................... 297/184; 135/96; 297/224
[58] Field of Search ............... 297/184; 280/289 R, 280/289 S, 32.5, 728, 743; 296/97 R; 135/88, 96; 248/205.3

[56] References Cited

U.S. PATENT DOCUMENTS

| | | | |
|---|---|---|---|
| 1,498,465 | 6/1924 | Marshall | 135/96 |
| 2,243,984 | 6/1941 | Singewald | 135/96 X |
| 2,904,103 | 9/1959 | Nail | 297/224 |
| 3,504,878 | 4/1970 | Dressler | 248/205.3 |
| 3,713,695 | 1/1973 | Von Wimmersberg | 297/488 |
| 4,311,339 | 1/1982 | Heath | 297/487 |

FOREIGN PATENT DOCUMENTS

| | | | |
|---|---|---|---|
| 19299 | of 1929 | Australia | 297/184 |
| 2614594 | 3/1977 | Fed. Rep. of Germany | 297/184 |

Primary Examiner—James T. McCall
Attorney, Agent, or Firm—Carver & Co.

[57] ABSTRACT

A sun shade for an infant's car seat has a flexible, sheet-like canopy which is generally horizontal in use. The canopy has a pocket formed at a first end for fitting over the top of the back of an infant's car seat. There is a flexible tension link at a second end of the canopy for stretchably anchoring the canopy to a part of the car's interior which is spaced-apart from the infant's car seat. There may be a pair of side flaps extending along opposite sides of the canopy between the ends thereof.

14 Claims, 9 Drawing Figures

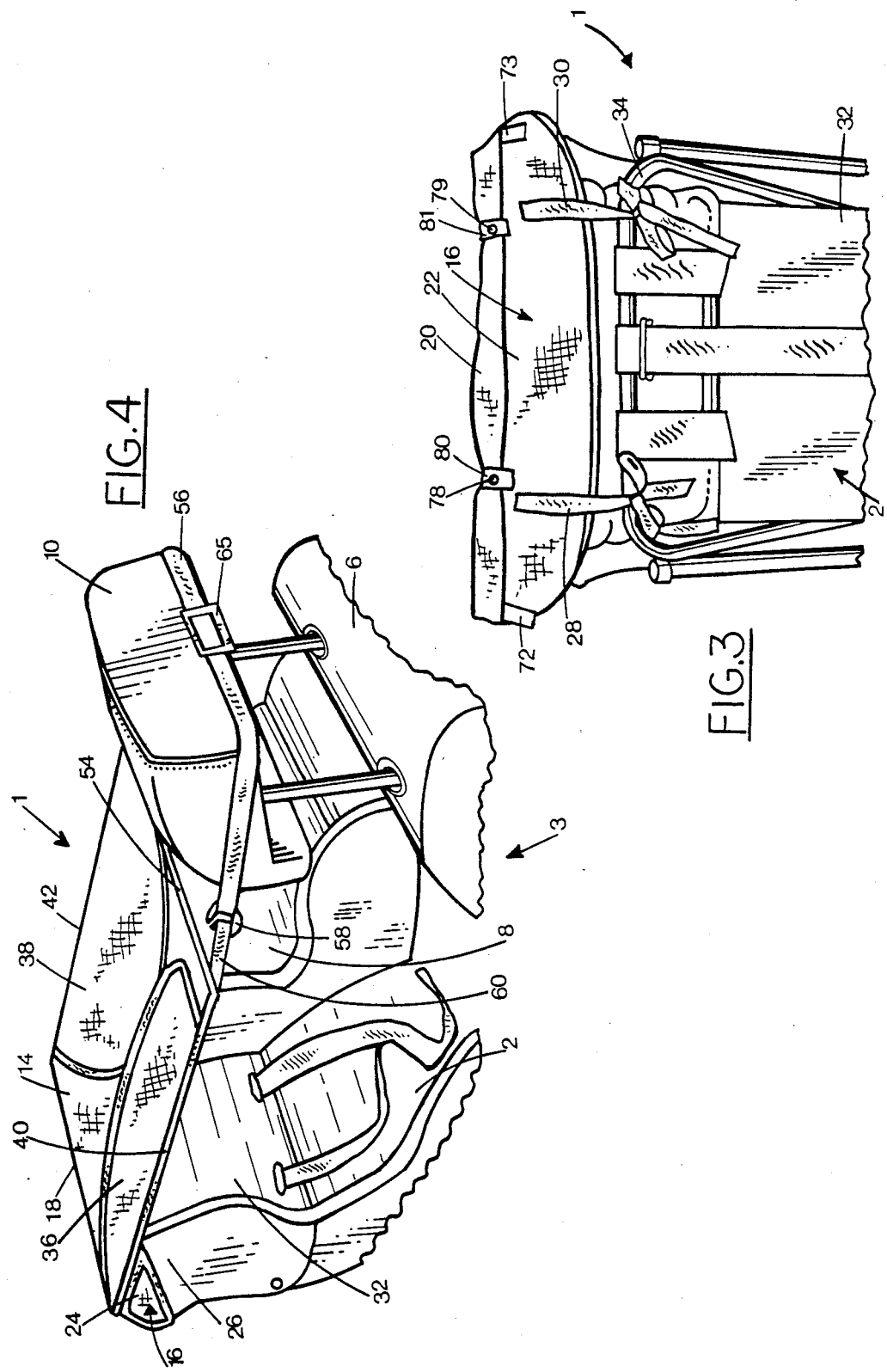

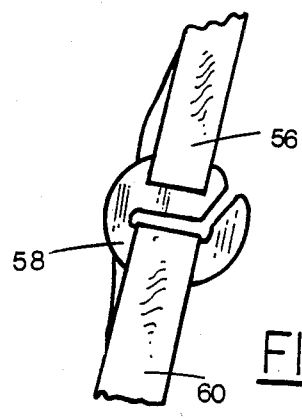
FIG. 6
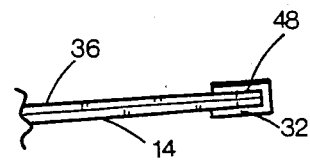
FIG. 7
FIG. 9
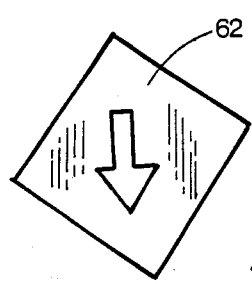
FIG. 8
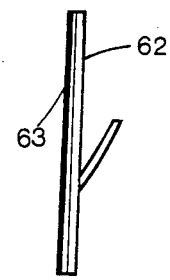

SUN SHADE FOR AN INFANT'S CAR SEAT

BACKGROUND OF THE INVENTION

This invention relates to a sun shade for an infant's car seat.

U.S. Pat. No. 4,293,162 to Pap discloses a sun shade for an infant's seat. Such sun shades do however have certain disadvantages. A rigid peripheral frame member is included to form a cantilevered structure. This frame makes the shade impossible to roll up for storage. More importantly, however, this rigid frame may provide increased risk of injury to the child in the event of an accident under certain conditions. U.S. Pat. No. 3,339,566 to Bowden shows a child's awning device for automobiles also employing a cantilevered rigid frame with similar disadvantages.

U.S. Pat. No. 2,840,093 to Mathews discloses a vapor contoller tent which includes a rectangular top panel held in a horizontal position by stretched elastic cords. The panel has edges which extend downwardly from the panel.

U.S. Pat. No. 2,015,588 to Brown shows a sleeping bag with a rectangular panel supported by ropes.

U.S. Pat. No. 2,864,429 to Combs shows a child's automobile seat with a rigid top member cantilevered from the seat. There is a side protector curtain on one or both sides detatachably secured to the top member by snap fasteners.

U.S. Pat. No. 1,541,215 to Hastings shows a bed canopy supported by tapes and having a rectangular panel with downwardly hanging side panels.

U.S. Pat. No. 2,044,664 to Brown shows an insect screen in the form of a canopy supported by rigid rods.

U.S. Pat. No. 571,443 to Hollingsworth shows a sun shade for canopied vehicles including downwardly extending sides.

Despite these earlier devices, the need remained for an effective sun shade for use on infant's car seats in automobile interiors which could be rolled up for easy storage and which would have no rigid frame which might cause injury to the child in the event of an accident.

SUMMARY OF THE INVENTION

The invention provides a sun shade for an infant's car seat mounted in a car's interior. The shade has a flexible sheet-like canopy which is generally horizontal in use. The canopy has a pocket formed at a first end for fitting over the top of the back of the infant's car seat. There is means at a second end, which is opposite the first end, for stretchably anchoring the canopy to a part of the car's interior spaced-apart from the infant's car seat.

Preferably there is a pair of side flaps extending along opposite sides of the canopy between the ends thereof. The sides flaps may have a raised position flat on top of the canopy and extending towards each other away form the sides of the canopy and a lowered position extending generally vertically downwards from the sides of the canopy.

BRIEF DESCRIPTION OF THE DRAWINGS

In the drawings:

FIG. 3 is a rear view of the sun shade installed on an infant's car seat and rolled up for storage;

FIG. 4 is a perspective view of the sun shade on a child's car seat of the rear seat of the car, extending to a front headrest and showing the side flaps in the raised position;

FIG. 6 is a fragmentary view of an elastic tape and associated hook and loop of the sun shade;

FIG. 7 is a fragmentary sectional view taken along line 7—7 of FIG. 2 with the flaps in the raised position;

FIG. 8 is an elevation of a self adhesive hook; and

FIG. 9 is a side view of the hook of FIG. 8.

DESCRIPTION OF THE PREFERRED EMBODIMENTS

Figure 1:
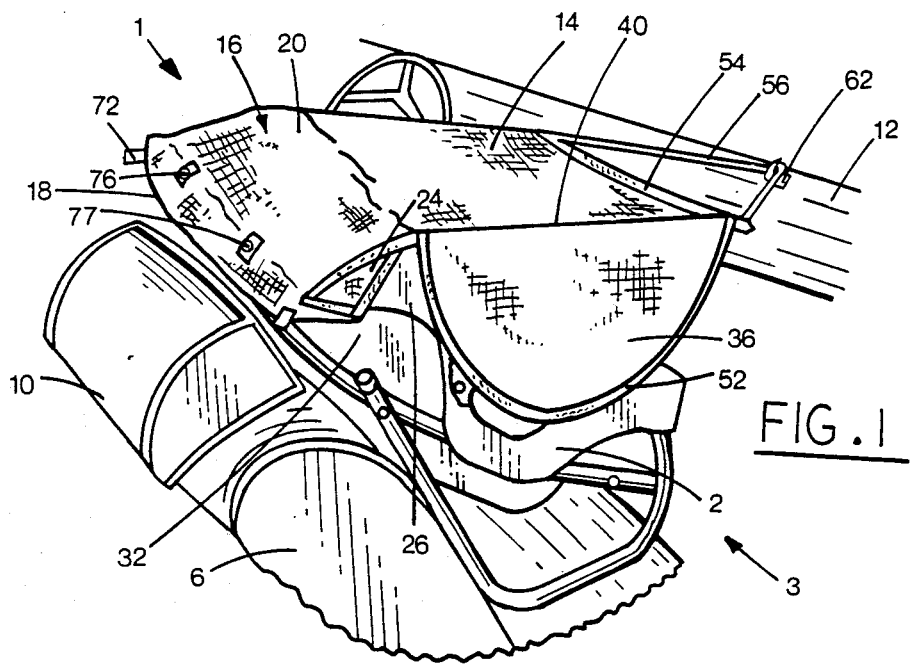
FIG. 1 is a perspective view of a sun shade for an infant's car seat mounted on the front seat of an automobile and connected to the dashboard.

The drawings illustrate a sun shade 1 for an infant's car seat 2 mounted in a car's interior 3. The car's interior has a front passenger seat 6 shown in FIG. 1 and a rear seat 8 shown in FIG. 4. The front seat is equipped with a head rest 10. The interior of the car also has a dash-board 12 in front of the front seat.

The sun shade has a flexible, sheet-like canopy 14 which is generally horizontal in use as may be seen in FIGS. 1 and 4. In this embodiment, the canopy is of cloth and is rectangular is shape. The canopy has a pocket 16 formed at a first end 18 of the canopy as best seen in FIGS. 1 and 3. The pocket includes a top panel 20 which may comprise an etension of canopy 14 or alternatively a separate piece of cloth sewed to the canopy. The pocket also has a back panel 22 and opposite triangular side panels 24, one of which is shown in FIG. 1. The other side of the canopy is a mirror image. The pocket is shaped to fit over the top 26 of the back 32 of the infant's car seat. Tapes 28 and 30 are sewn onto the sun shade adjacent first end 18 for tying the sun shade to suitable means such as frame 34 on back 32 of the infant's car seat.

The sun shade has a pair of side flaps 36 and 38 which extend along opposite sides 40 and 42 of the canopy. In this embodiment, the flaps are semi-circular in shape and like the canopy are made of cloth. The side flaps have a raised position shown in broken lines in FIG. 2 and in full lines in FIG. 4. In this position, the flaps are flat on top of the canopy and extend towards each other away from the sides of the canopy. The flaps also have a lowered position illustrated by flap 36 in FIG. 1 where the flaps extend generally vertically downwards from the sides of the canopy. One or both flaps can be lowered according to the angle of the sun.

Figure 2:
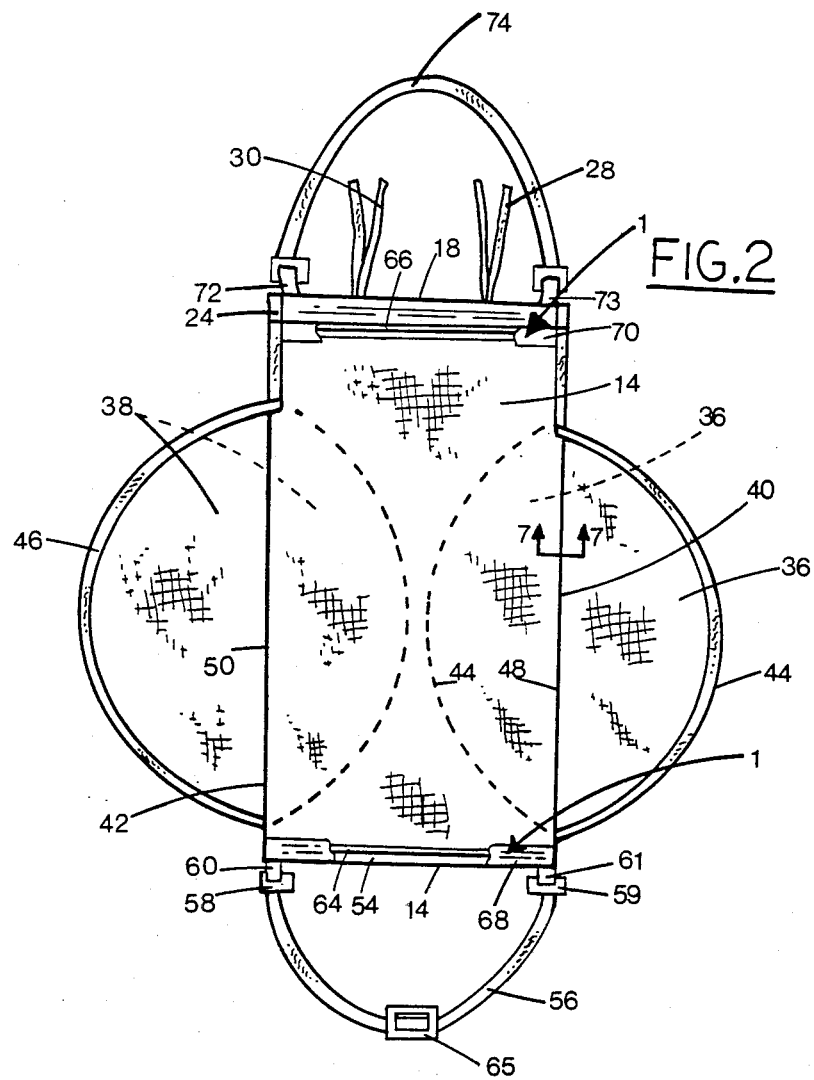
FIG. 2 is a top plan view of the sun shade showing the side flaps extending outwardly therefrom in solid lines and showing the flaps in a raised position in broken lines.

The side flaps have distal ends 44 and 46 which extend towards each other in the raised position shown in broken lines in FIG. 2. The flaps also have proximate ends 48 and 50 adjacent the sides of the canopy. Referring to FIG. 7, which shows flap 36, proximate end 48 is sewn flat on top of the canopy 14. Piping 52 is sewn about the exposed ends of the canopy and the flap for finishing purposes. This structure inhibits any tendency for the flaps to unroll to the lowered position when they have been placed in the raised position. The piping 52 extends completely around the flaps, the panels of the pockets 16 and the canopy.

The sun shade has a second end 54 which is opposite the first end 18. The second end has means for stretchably anchoring the canopy to a part of the car's interior spaced-apart from the infant's car seat. In this embodiment, the means for stretchably anchoring comprises a flexible tension link in the form of an elastic cloth tape 56. Referring to FIGS. 2 and 6, the elastic tape is doubled and is provided with plastic hooks 58 and 59 at each end. The hooks are shaped to connect to a pair of cloth loops 60 and 61 at the second end of the canopy adjacent the sides. The tape also has an adjuster 65 to permit adjustment according to the measurements of the car's interior.

The elastic tape 56 extends about head rest 10 of front seat 6 when the infant's seat is mounted on the back seat of the car as shown in FIG. 4. When the infant's seat is mounted on the front seat of the car, the elastic tape extends about a self-adhesive hook 62 as shown in FIGS. 1, 8 and 9. The hook has an adhexive surface 63 and is commercially available.

The shape of canopy 14 is maintained by stiffening rods 64 and 66 at opposite ends thereof as shown in FIG. 2. These rods are located within hems 68 and 70. The rods are of shatter proof plastic and are not to be compared to the rigid frames used in some other sun shades of the general type. The sun shade has a second pair of loops 72 and 73 at first end 18 as shown in FIG. 2. These loops are used for connecting a second elastic tape 74 which provides means for stretchably anchoring the first end of the canopy to another part of the car's interior. For example, this can be used for anchoring the canopy to the rear shelf of the vehicle when the infant's seat is mounted on the rear seat of the car.

Figure 5:
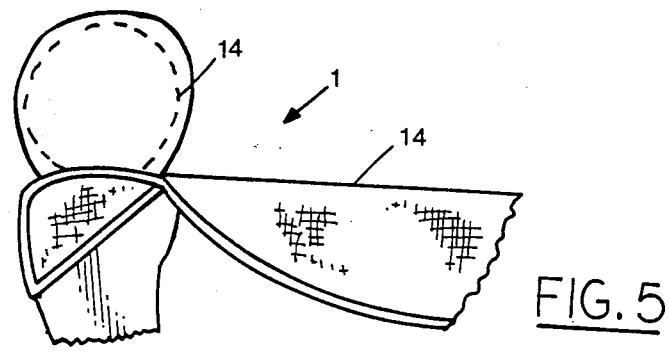
FIG. 5 is a fragmentary side view showing the rear portion of the sun shade and in broken lines showing the sun shade rolled up for storage.

A pair of snap fasteners 76 and 77 are located on the top panel 20 of pocket 16. A complementary pair of snap fasteners 78 and 79 are connected to tapes 80 and 81 sewn on the opposite side of the top panel. The canopy and flaps can be rolled back to the position shown in FIG. 3 and indicated in broken lines in FIG. 5. The snap fasteners hold the rolled up canopy in position for storage.

The sun shade 1 is also suitable for infant carriers for very small infants which fit on the front seat of the car facing towards the back. The sun shade stretches between the back of the infant carrier and the head rest of the front seat. Such infant carriers typically lack the frame 34 of seat 2 for tying tapes 28 and 30. Accordingly, a self adhesive hook is mounted on the back of the carrier and used in conjunction with elastic tape 74 to secure the sun shade to the back of the carrier.

What is claimed is:

1. A sun shade for an infant's car seat having a back with a top and being mounted in a car's interior, the shade comprising:
a flexible, sheet-like canopy which is generally horizontal in use, having a pocket formed at a first end for fitting over the top of the back of the infant's car seat and means at a second end, which is opposite the first end, for stretchably anchoring the canopy to a part of the car's interior spaced-apart from the infant's car seat, a pair of side flaps extending along opposite sides of the canopy between the ends thereof, the side flaps having a raised position flat on top of the canopy and extending towards each other away from the sides of the canopy, and a lowered position extending generally vertically downwards from the sides of the canopy.

2. A sun shade as claimed in claim 1, wherein the side flaps are flexible, sheet-like and have distal ends, the distal ends of the two side flaps extending towards each other in the rasied position, and proximate ends proximate the sides of the canopy which are sewn flat on top of the canopy.

3. A sun shade as claimed in claim 1, wherein the means for stretchably anchoring comprises the flexible tension link connected to a second end of the canopy.

4. A sun shade as claimed in claim 3, wherein the flexible tension link is an elastic cloth tape.

5. A sun shade for an infant's car seat having a back with a top and being mounted in a car's interior, the shade comprising:
a flexible, sheet-like, rectangular canopy which is generally horizontal in use, having a pocket formed at a first end for fitting over the top of the back of the infant's car seat and means at a second end, which is opposite the first end, for stretchably anchoring the canopy to a part of the car's interior spaced-apart from the infant's car seat, the means for stretchably anchoring including an elastic cloth tape and a pair of spaced-apart loops at the second end of the canopy for connecting the tape to the canopy.

6. A sun shade as claimed in claim 5, further comprising hooks on the tape securable to the loops on the canopy.

7. A sun shade as claimed in claim 5, wherein the means for stretchably anchoring further comprises a self-adhesive hook for adhering to the part of the car's interior and for engaging the tape.

8. A sun shade as claimed in claim 7, wherein the car's interior has a front passenger seat and a dashboard, the infant's car seat being mounted on the front passenger's seat and the part of the car's interior being the dashboard.

9. A sun shade as claimed in claim 5, wherein the car's interior has a rear seat and a front seat with a head rest, the infant's car seat being mounted on the rear seat and the cloth tape being receivable about the headrest.

10. A sun shade as claimed in claim 1, wherein the infant's car seat has a back and the sun shade further comprises ties connected to the second end of the canopy for tying the sun shade to the back of the infant's car seat.

11. A sun shade as claimed in claim 5, further comprising stiffening means extending along at least one end of the canopy.

12. A sun shade as claimed in claim 11, wherein the canopy has hems extending along the at least one end, the stiffening means being in the hem.

13. A sun shade as claimed in claim 5, further comprising means at the first end of the canopy for stretchably anchoring the first end of the canopy to another part of the car's interior.

14. A sun shade as claimed in claim 13, wherein the means at the first end comprises a pair of spaced-apart loops and an elastic tape connectable to the loops.

* * * * *